United States Patent [19]

Turney

[11] 4,286,620
[45] Sep. 1, 1981

[54] COMBINATION TORCH AND CHECK VALVE ASSEMBLY

[75] Inventor: Larry R. Turney, Denton, Tex.

[73] Assignee: Victor Equipment Company, Denton, Tex.

[21] Appl. No.: 167,827

[22] Filed: Jul. 14, 1980

[51] Int. Cl.³ ............................................. F16K 19/00
[52] U.S. Cl. .............................. 137/454.2; 137/514.7;
    137/543.19; 137/606; 137/614.2; 239/416.2
[58] Field of Search ............... 137/454.2, 454.4, 514.5,
    137/514.7, 543.19, 606, 614.2; 239/413, 416.2;
    266/48

[56] References Cited

U.S. PATENT DOCUMENTS

| | | | |
|---|---|---|---|
| 1,246,573 | 11/1917 | Fauser | 239/416.2 |
| 2,084,294 | 6/1937 | Cooper | 137/454.2 X |
| 2,649,277 | 8/1953 | Blackford | 137/543.19 X |
| 2,800,142 | 7/1957 | Champion | 137/543.19 |
| 3,058,486 | 10/1962 | McDermott | 137/543.19 X |
| 3,626,977 | 12/1971 | Riley | 137/543.19 X |

Primary Examiner—Robert G. Nilson
Attorney, Agent, or Firm—Wofford, Fails & Lobal

[57] ABSTRACT

A torch combination characterized by a torch handle having a body, barrel and head with at least fuel and oxygen passageways and at least fuel and oxygen valves and an improvement comprising respective check valve bodies disposed in fluid communication with respective fuel and oxygen passageways and connected with a torch handle and having check valve subassemblies received in chambers in each. The two respective check valves subassemblies include a guide having a retainer disposed in one end thereof. The retainer has a seal adjacent its interior end with a moveable seat biased thereagainst inside the guide. Respective first and second means hold guide and retainer together and hold the check valve subassembly within the chambers. Hose connectors are connected with respective fuel and oxygen passageways such that the check valve subassembly block any reverse flow into the hoses and regulators and prevent danger of explosion.

9 Claims, 9 Drawing Figures

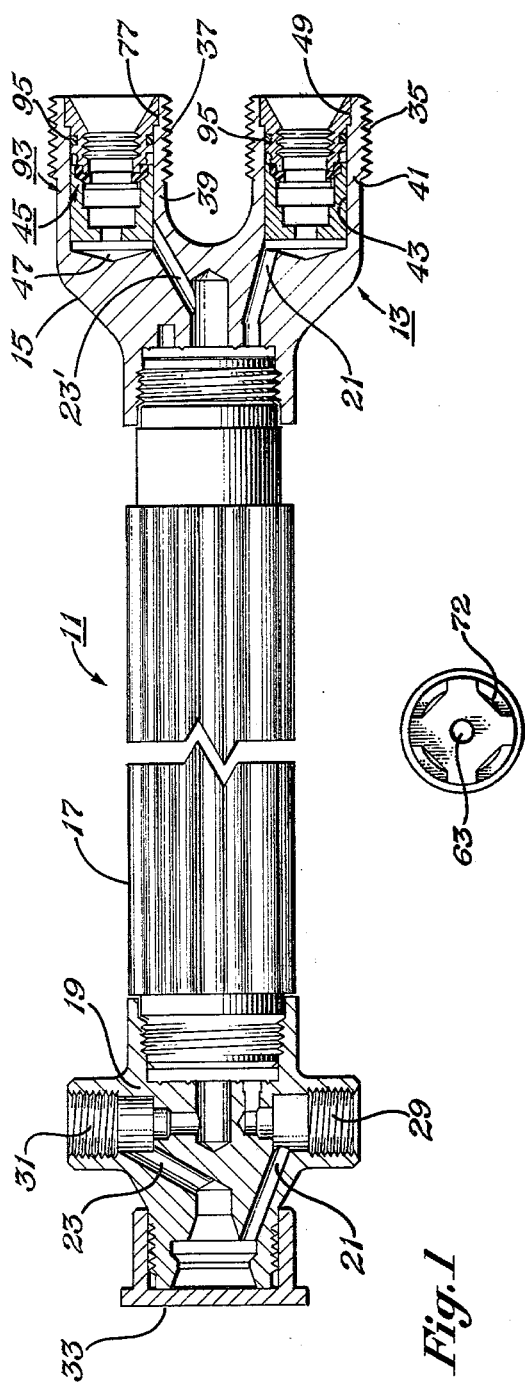
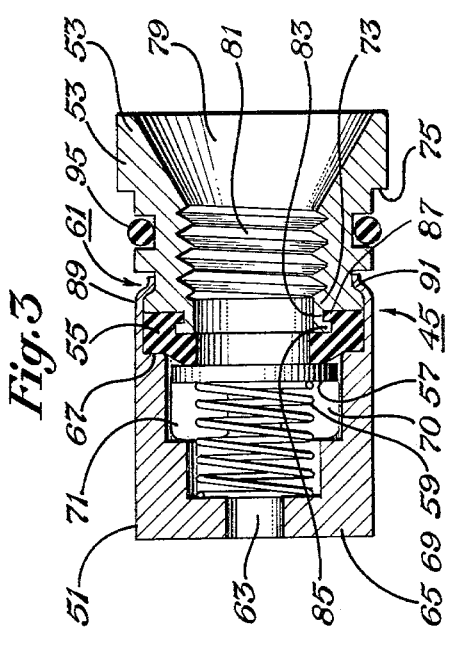
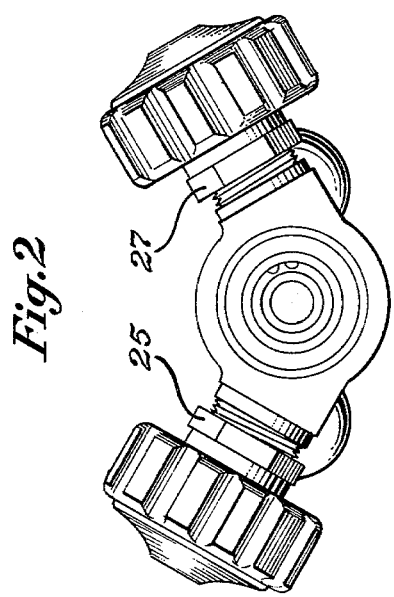

COMBINATION TORCH AND CHECK VALVE ASSEMBLY

FIELD OF THE INVENTION

This invention relates to torch combinations for supporting attachments for cutting, heating and the like. More particularly, this invention relates to the combination torch and check valve assembly in which the check valves are integrally formed into the torch, the torch carrying the attachments for cutting, heating and the like or being a straight cutting torch.

DESCRIPTION OF THE PRIOR ART

In the prior art, there are a wide variety of check valves employing poppets, balls, flappers and the like that support tips for cutting metals, heating metals and for other purposes. Typical of the patents that were turned up by a search on the combination of torch and check valves are the U.S. Pat. Nos. 640,638; 1,726,804; 2,981,322; 3,503,418; 3,791,406; 3,873,028; 4,143,853. These references disclose a variety of check valves which are mounted at the inlet of connector elements but are not specifically associated with torches for cutting, heating and the like. A conventional check valve assembly is frequently too heavy and bulky for use in combination with a welding torch. Specifically, the check valve assembly must be exceptionally light in weight in order not to unbalance the torch when being used by a welder or the like. Moreover, the check valve must operate exceptionally rapidly and with low inertia so as to effect closure to shut off reverse flows and the like and prevent the danger of either burning in the hose of the fuel or oxygen or traveling back up to the regulator, with danger of an explosion. Such explosions are of course hazardous to personnel.

In particular, the prior art has failed to provide a check valve that was lightweight so as not to unbalance a torch and that could be combined with the torch; for example, be incorporated in a hose connection at a torch and provide adequate flow. The prior art check valves did not minimize external dimensions and maximize the internal flow path and satisfy the requirement for low spring loading and low inertia.

In addition, the regulations from the governmental regulation agencies have sought to provide safety but the combinations that have been tried heretofore have been readily circumvented by the workers simply failing to connect the check valves into hoses, regulators and the like.

SUMMARY OF THE INVENTION

Accordingly, it is an object of this invention to provide a torch combination that obviates the disadvantages of the prior art approaches and yet provides economical, balanced torch combination.

It is a specific object of this invention to provide an integral cutting torch or torch handle and check valve combination; to which could be affixed hoses and attachments for welding, cutting, heating and the like and that obviated the disadvantages of the prior art and provided the safety without expense and imbalancing of the torch.

These and other objects will become apparent with the descriptive matter hereinafter, particularly when taken in conjunction with the appended drawings.

In accordance with this invention there is provided an improvement in a torch combination for cutting, heating and the like including at least a body and head that includes at least fuel and oxygen passageways and at least fuel and oxygen valves. The improvement comprises two respective check valve bodies disposed in fluid communication with the respective fuel and oxygen passageways connected with the torch handle; each of the check valve bodies having a chamber for receiving a check valve subassembly; and two respective check valve subassemblies inserted within the respective chambers. Each chamber has its first end with a passageway and its second end open for receiving the check valve subassembly. Each check valve subassembly includes a guide having a passageway penetrating longitudinally therethrough and having a first diameter at a first end and a second diameter greater than the first diameter for receiving a retainer; a retainer disposed with its first end in the second diameter passageway; a seal disposed on the first end of the retainer; a movable seat disposed in the guide adjacent the seal; biasing means biasing the movable seat toward the seal for blocking reverse flow, first means holding the guide and retainer together; second means holding the check valve subassemblies within their respective chambers; and respective hose connectors connected with the respective check valve bodies adjacent the second ends for connecting respectively with the fuel and oxygen hoses; such that reverse flow is arrested before it enters a respective hose and regulator. This reduces the danger of explosion.

Specific preferred structural embodiments are described. In these structural embodiments, the chambers are placed in either the body of the torch handle or in the valves, per se. Moreover it is immaterial in this invention whether the combination of torch and check valves be in a cutting torch, per se, or in a handle for supporting heating and cutting attachments.

BRIEF DESCRIPTION OF DRAWINGS

FIG. 1 is a partial cross sectional view of a front valve torch incorporating the integral check valve subassemblies in accordance with one embodiment of this invention.

FIG. 2 is an end view of the torch of FIG. 1 showing the valves inserted.

FIG. 3 is a cross sectional view of the check valve subassembly for each of the chambers.

FIG. 3a is an end view thereof.

DESCRIPTION OF THE PREFERRED EMBODIMENTS

Figure 5:
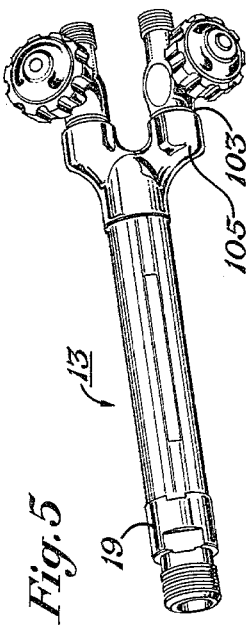
FIG. 5 is an isometric view of another embodiment of this invention in which the valves have the chamber for receiving the check valve subassemblies and are screwed into the body of the torch.

Referring to FIG. 1, the torch combination 11 includes a torch handle 13 having a body 15, a barrel 17 and a head 19. The handle 13 includes at least two passageways 21, 23 for, respectively, fuel and oxygen. As can be seen in FIG. 2, respective oxygen valve 25 and fuel valve 27 are interposed in their respective chambers 29, 31, in the head 19. As is conventional, the respective valves are held in place by threaded nut conformingly engaging threaded male connection on the head 19. As illustrated in FIG. 1, a cover plate 33 covers a threaded neck for having a torch tip emplaced onto the torch handle. The torch tip may comprise any of the usual attachments, including heating tips, or welding tips, and the like depending upon the type of torch handle employed. As illustrated, the torch handle 13 is a front valve torch in which the valves are located in the head the check valves are in the body adjacent the hose connections 35, 37. As will be appreciated by those skilled in this art, the illustrated torch handle 13 is for conventional heating and welding tips; and a different type of torch handle is employed if a cutting torch tip is the attachment to be used. The cutting torch tip requires a separate cutting oxygen flow passageway and cutting oxygen valve.

In the improved torch combination of this invention, there are also provided two check valve bodies 39, 41 disposed in fluid communication with the respective oxygen and fuel passageways and connected with the torch handle. As illustrated, the respective check valve bodies 39, 41 are integrally formed with the torch handle body 15.

Each check valve body has a chamber 43 for receiving a check valve subassembly 45. Each chamber 43 has a first end 47 having a passageway and a second end 49 open for receiving the check valve subassembly when inserted thereinto.

Figure 3B:
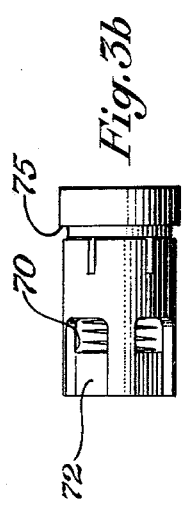
FIG. 3b is a side elevational view thereof.

Each of the check valve subassemblies 45 can be seen more clearly by referring to FIG. 3. Each check valve subassembly includes a guide 51, a retainer 53, a seal 55, a seat 57, a biasing means 59 and a first means 61 holding the guide and retainer together. The guide 51, FIGS. 3 and 7, has a bore 63 penetrating longitudinally therethrough. It has a first diameter at a first end 65 and a second diameter at a second end 67 that is larger than the first end for receiving a retainer. As illustrated, the central passageway has a third diameter 69 for receiving the biasing means 59. The guide 51 also has a fourth diameter 71 for receiving the seat 57. The guide may be formed of any of the conventional materials such as brass or other copper alloy, plastic such as the thermoplastic materials like polybutylene, polyethylene, polyacrylonitrilebutadinestyrene (ABS), polypropylene; and stainless steel or the like. The guide has flow passages defined by lateral apertures 70 and exterior slots 72, FIGS. 2-3b, and 7.

Figure 7:
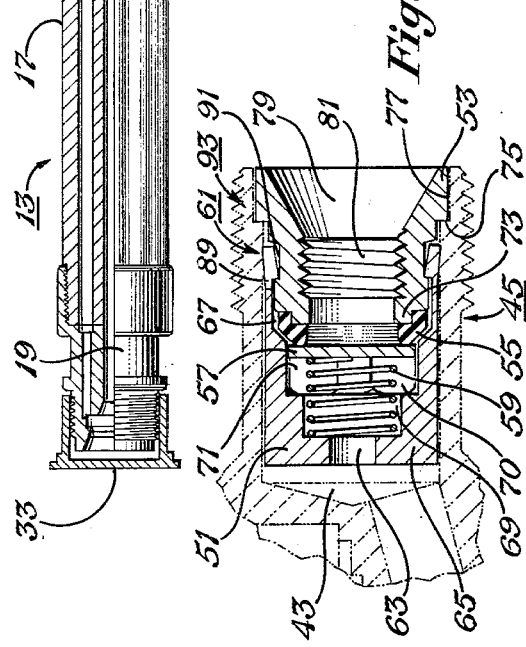
FIG. 7 is a partial cross sectional view of another embodiment of the check valve subassembly employing an interference fit between chamber walls and compressible collet fingers of the check valve.

The retainer 53 is disposed with its first end 73 in the second diameter passageway. The retainer has a shoulder 75 for seating in a mating recess 77, FIG. 1 and FIG. 7 in the second end 49. The retainer 53 has a frusto conical inlet throat 79 for providing conventional metal-to-metal seating with mating hose fitting. Disposed in the central longitudinal passageway is a threaded section 81 to facilitate insertion of a threaded tool for disassembly. The retainer 53 may be made of the same material as the guide 51. The retainer must be able to support on its first end 73, the seal 55. The seal 55 comprises an annular ring of resilient material; such as, Neoprene (trademark for synthetic rubber), or other suitable firm but resilient sealing material. As illustrated, it is an annular ring that is disposed about the first end 73. As illustrated in FIG. 3, the first end 73 has a groove 83 disposed around its throat 85 and the seal 55 has a support ring 87 that slips over the throat and into the groove 83 for retaining the seal in place. As illustrated in FIG. 7, the seal is adhered onto the first end 73 by an adhesive. A suitable adhesive comprises the polyacrylate, polymethacrylate, polyepoxy type resins. They are "set" with their respective catalysts, or initiators; such as N,N-dimethyl-p-toluidine; or N,N dimethyl aniline. With the polyepoxy resins, cobalt naphthenate may be employed. Similarly, the catalysts methyl ethyl ketone peroxide may be employed. Other adhesives such as the urethanes, cyano-acrylate resins may be employed. In any event, the seal 55 must be held in place so as to form a seal and block reverse flow of gases when engaged by the seat 57.

The seat 57 is illustrated as a circular stainless steel plate with an exceptionally smooth finish that seals against the seal 55 to block back flow and prevent cutting of the seal or seat. Of course, other forms of seat may be employed but the small, lightweight plate has low inertia and can readily open and close for the respective directions of flow as indicated by the pressure gradient of low magnitude.

To assist in reseating the plate 57, there is provided a biasing means 59. As illustrated, the biasing means 59 comprises a coil spring. The coil spring has a very low strength so to allow opening of the check valve against very low pressures. For example, the spring will open with as little as four ounces per square inch pressure in the illustrated embodiment. The spring may be formed of brass, stainless steel, or other materials compatible with the gas to be flowed through the check valve; similarly as was the case with the seat 57.

The first means 61 holding the guide and the retainer together may take any one of several forms. For example, there may be collet fingers engaging a groove, with or without an interference fit; or there may be a crimp to engage machine cut parts that overlap. As illustrated, the first means 61 comprise collet fingers 89 that conformingly engage a recess, or annular groove, 91. In the embodiment of FIG. 3, the collet fingers do not protrude beyond the dimensions of the retainer such that the entire check valve assembly can be held in place by one type of second means. On the other hand, in FIG. 7 the collet fingers 89 extend beyond the lateral dimensions of the retainer so as to form an interference fit and a second kind of second holding means.

As implied from the foregoing, the torch combination 11 includes a second means 93, FIGS. 1 and 7, holding the check valve subassembly within its chamber 43. As implied from the foregoing the second means may comprise a plurality of different approaches. In the embodiment of FIG. 1, the check valve subassembly is adhered in place by adhesive applied either to the exterior walls of the check valve subassembly or to the interior walls of the chamber 43, or both. Typically, catalysts may be applied to one and adhesive to the other such that completion of the setting of the adhesive is done after the check valve subassembly is in place. As can be seen in FIG. 1, the check valve subassembly is emplaced with the O-ring 95 preventing leakage between the exterior walls of the check valve subassembly and interior walls of the chamber 43.

In the embodiment of FIG. 7, the second means 93 comprises the collet fingers that extend beyond the dimensions of the guide and retainer so as to be compressibly forced inside the wall of the chamber 43 for a friction interference fit to retain check valve subassembly in place. If desired, adhesive or the like may be employed adjacent the shoulder 75 to insure sealing.

The ordinary materials of construction will be employed in constructing the torch handle 13 and the valves 25 and 27.

In operation, the torch handle is constructed and assembled as shown hereinbefore and in accordance with this invention. Specifically, the body 15 has an elongate chamber 43 formed therein for sealingly receiving the check valve subassemblies 45 in the respective chambers 43. The hose connections 35, 37 are prepared for connection respectively with the fuel and oxygen hoses extending from a regulator and a high pressure container or the like. The check valve subassemblies are inserted and the hose connections connected. Thereafter, the torch has its tip assembly emplaced after removal of the protective cover 33. The valves 25 and 27 are, of course, inserted. The torch is then ready for use.

Figure 4:
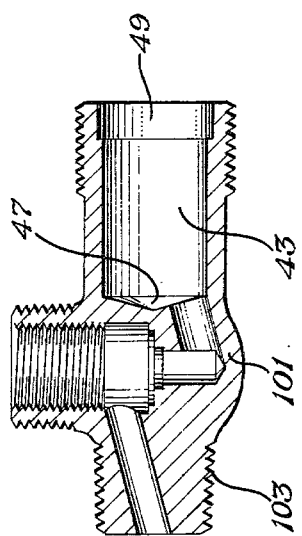
FIG. 4 is a cross sectional view of a valve having the chamber for receiving the check valve subassembly in the end having the hose connector.

Other embodiments illustrate different ways in which the check valve subassembly can be made an integral part of the torch handle. Referring to FIG. 4, the chamber 43 is placed adjacent the hose connections 99 formed onto the body of the valve 101. The threaded section 103 of the valve 101 is then screwed into the conventional threaded receptacle of the body, shown as receptacle 105, FIG. 5. Similarly as described hereinbefore, the chamber has its first end 47 and its second end 49 of a larger diameter for receiving the check valve subassembly as described with respect to FIGS. 1 and 3. The valve 101 may be formed of any of the conventional materials, such as brass, the copper alloy, stainless steel or the like.

Figure 6:
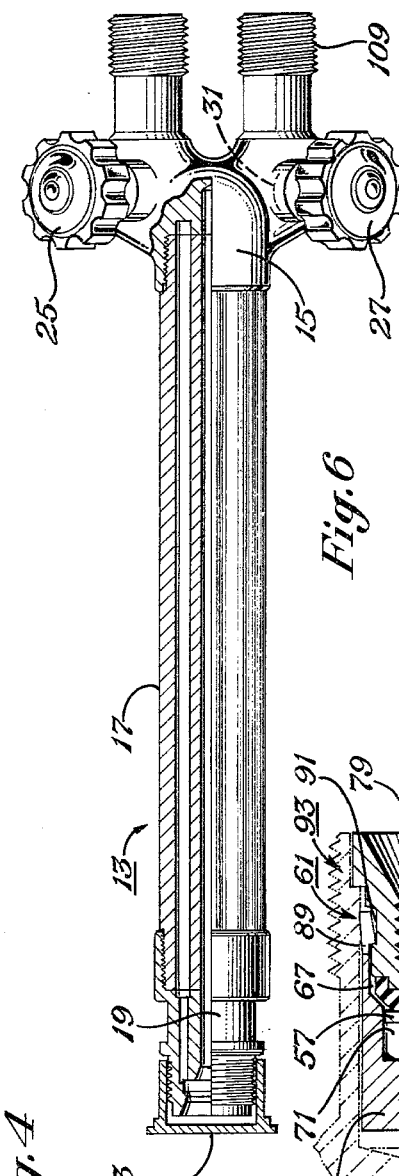
FIG. 6 is a plan view, partly in section, of a torch in accordance with another embodiment in which the valves are inserted in the body adjacent the chambers for receiving the check valve subassemblies.

As illustrated in FIG. 6, the torch may be formed in three separate pieces in which the torch handle 13 has the barrel 17 formed separately from the head 19 and the body 15. In the body 15, the chambers 43 are formed internally of the hose connectors 109. The valves 25, 27 are inserted in their separately formed valve chambers 31. Protective cover 33 is removable for affixing suitable attachment, such as a heating tip assembly. The check valve subassemblies insert in each of the chambers in the embodiment of FIG. 6, similarly as described with respect to the embodiment of FIG. 1.

The operation of the respective embodiments are the same in that a flow loss in one of the hoses causes seating of the seat against the seal to block reverse flow of the remaining flowing gas and prevents mixing in the hose for either the oxygen or fuel or in the regulator for either oxygen or fuel. In particular, it is useful in preventing an explosive mixture from traveling completely to a regulator or the like whose frangible parts might be blown up in the resulting explosion when the flow loss was corrected and the torch relighted.

From the foregoing it can be seen that this invention accomplishes the objects delineated hereinbefore. In particular, this invention provides an integral torch and check valve combination that does not imbalance the torch for the user; that maintains a combination that is not easily circumvented to avoid the safety regulations of governmental agencies; that is economical and readily affordable; and, yet, provides a safe combination that alleviates the problems of the prior art.

Although the invention has been described with a certain degree of particularity, it is understood that the present disclosure is made only by way of example and that numerous changes in the details of construction and the combination and arrangement of parts may be resorted to without departing from the spirit and the scope of the invention, reference for the latter being had to the appended claims.

I claim:

1. In a torch combination that includes at least a body, barrel and a head that includes at least fuel and oxygen passageways and at least respective fuel and oxygen valves; the improvement comprising:

two respective check valve bodies disposed in fluid communication with said respective fuel and oxygen passageways and connected with said torch handle; each said check valve body having a chamber for receiving a check valve subassembly; each said chamber having a first end having a passageway and having a second end open for receiving said check valve subassembly;

two respective check valve subassemblies inserted within said respective chambers; each said check valve subassembly including;

a. a guide having at least one flow passage and a central bore having a first diameter at a first end and a second diameter greater than said first diameter at a second end for receiving a retainer;

b. a retainer disposed with a first end disposed in said second diameter passageway;

c. a seal disposed on said first end of said retainer;

d. a moveable seat disposed in said guide and adjacent said seal;

e. biasing means biasing said moveable seat toward said seal;

f. first means holding said guide and retainer together; and g. second means holding said check valve subassemblies within said chambers; and respective hose connectors connected with said check valve bodies adjacent said chamber second ends for connecting respective fuel and oxygen hoses therewith; such that any reverse flow is arrested before it enters a respective hose and regulator and danger of explosion is minimized.

2. The torch combination of claim 1 wherein said seal is annularly disposed about the central bore and said seat comprises a plate that is moveable against said seal to block flow in one direction and is moveable away from said seal to allow flow in normal operation of said torch.

3. The torch combination of claim 2 wherein said retainer has a throat at its first end with a central bore disposed centrally thereof and penetrating longitudinally therethrough and said throat has an annular groove on its exterior surface, and said seal has a central passageway aligned with said central bore of said retainer and has a support ring disposed in said annular groove of said throat.

4. The torch combination of claim 1 wherein each said first means includes respective annular groove and engaging collet fingers disposed on and connected with said retainer guide.

5. The torch combination of claim 4 wherein said guide has said collet fingers connected therewith and said retainer has said annular groove disposed thereabout.

6. The torch combination of claim 5 wherein said collet fingers extend radially outwardly beyond said guide diameter and are compressible such that said second means comprises having said collet fingers inserted in compression within said check valve body and said guide conformingly fits said check valve body such that said fingers in compression hold said check valve in said body by frictional fit.

7. The torch combination of claim 1 wherein said second means comprises an adhesive adhesively holding said check valve subassembly in said check valve body.

8. The torch combination of claim 1 wherein said chambers for receiving check valve subassemblies are formed integrally into the body of the torch handle.

9. The torch combination of claim 1 wherein said chambers for receiving said check valve subassemblies are formed in the respective fuel and oxygen valves that are screwed into the body of the torch handle.

* * * * *